July 22, 1958     R. J. BECHT ET AL     2,844,305
REFRIGERATING APPARATUS

Filed Nov. 3, 1953     2 Sheets-Sheet 1

INVENTOR.
Richard J. Becht
BY John H. Heidorn

R. R. Candar
Their Attorney

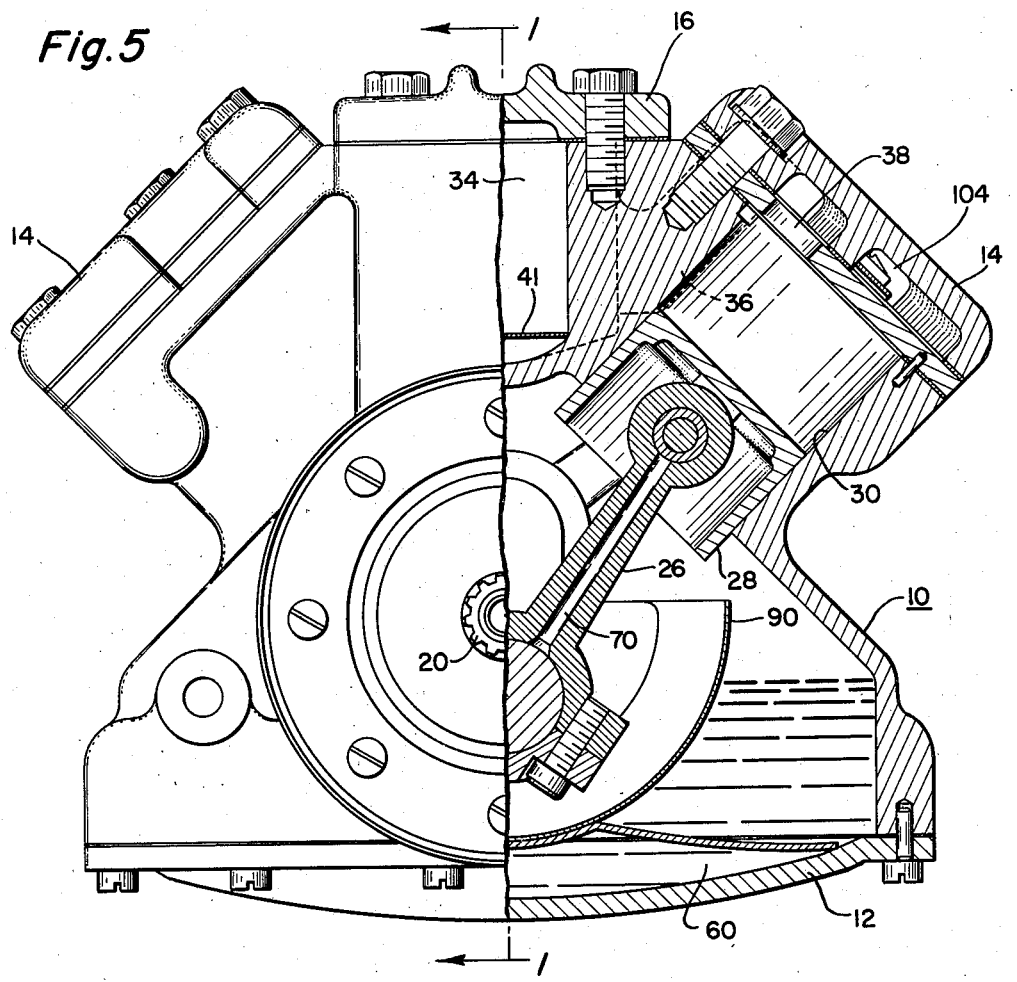
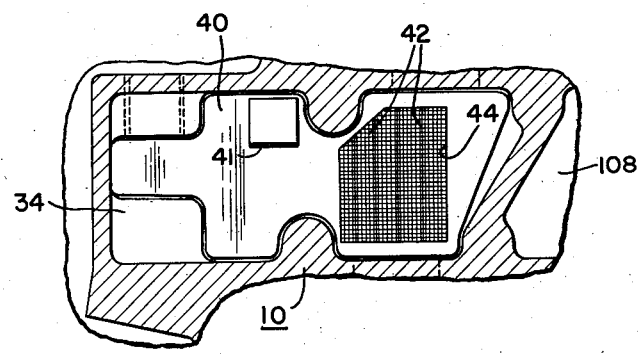

United States Patent Office 2,844,305
Patented July 22, 1958

2,844,305

REFRIGERATING APPARATUS

Richard J. Becht and John Henry Heidorn, Dayton, Ohio, assignors to General Motors Corporation, Detroit, Mich., a corporation of Delaware Application November 3, 1953, Serial No. 389,982

9 Claims. (Cl. 230—206)

This invention relates to refrigerating apparatus and more particularly to a closed refrigerant system for use in automobile air conditioning systems and the like.

It is an object of this invention to provide a compressor and oil handling means which are particularly suited for use in automotive air conditioning systems wherein it is important to keep down the size and weight of the system to a minimum and wherein the compressor is required to operate at high speeds.

A number of problems present themselves in designing refrigeration equipment for use in an automobile air conditioning system which are not present in designing other types of systems. Due to the high speeds at which the compressors are required to operate when belted directly to the car engine it is of paramount importance that an adequate quantity of lubrication is available at all times. Increasing the size of the oil reservoir and the quantity of oil is not the solution as this presents other problems. Thus, an increase in the size of the oil reservoir would objectionably increase the size of the compressor.

It is another object of this invention to provide an improved oiling arrangement which eliminates the need for a large oil sump in the bottom of the compressor.

Another object of this invention is to provide an improved means for separating the lubricant from the incoming refrigerant and for returning the separated refrigerant directly to the oil sump.

Another object of this invention is to provide a compressor having a shallow oil sump in which means are provided for preventing the crankshaft from splashing into the main oil supply even though the oil level is higher than the lowermost portion of the crank shaft.

Still another object of this invention is to prevent frothing oil from entering the compression chambers.

Still another object of this invention is to provide a refrigerating system using a small compact four cylinder V-shaped compressor which may be manufactured at a low cost and which is capable of operating satisfactorily over long periods of time at high speeds.

Further objects and advantages of the present invention will be apparent from the following description, reference being had to the accompanying drawings, wherein a preferred form of the present invention is clearly shown.

In the drawings:

Figure 4 is a fragmentary sectional view taken substantially on line 4—4 of Figure 1; and Figure 5 is an end elevational view with parts broken away showing the general arrangement of parts within the compressor housing.

Figure 1:
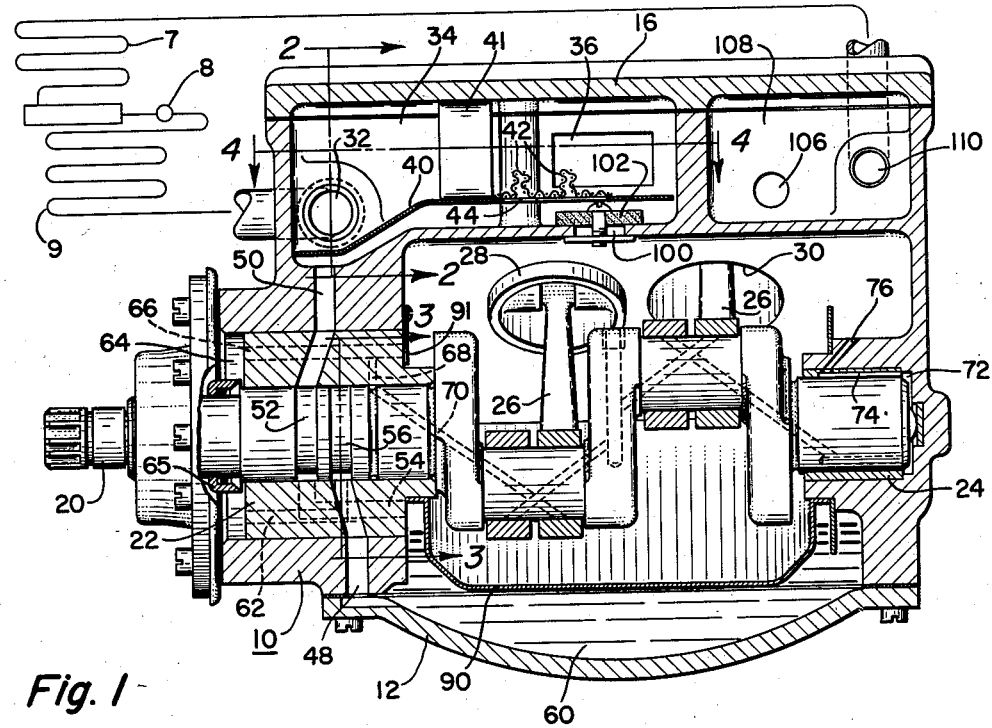
Figure 1 is a vertical sectional view taken substantially on line 1—1 of Figure 5 showing a preferred embodiment of the invention.

Referring now to the invention wherein a preferred embodiment has been shown, reference numerals 7, 8, 9 and 10 designate the condenser, expansion valve, evaporator and compressor respectively of a closed refrigerating system. The compressor comprises a main housing having a removable oil pan 12 and removable head portions 14 and 16 as best shown in Figure 5. For purposes of illustrating the invention there is shown a four cylinder V-type compressor whereas certain aspects of the invention are equally applicable to other types of compressors. In the compressor shown the main crankshaft 20 is rotatably supported within the end walls of the housing 10 by means of bearing inserts 22 and 24, which are arranged as best shown in Figure 1 of the drawing. Suitable connecting rods 26 drivingly connect the offset portions on the crankshaft with the pistons 28 which operate within the usual cylinder bores 30 provided directly in the main housing 10.

In any conventional compression type of refrigerating system a certain amount of oil is circulated with the refrigerant at all times. The incoming oil and low pressure refrigerant vapor enters an oil separating chamber 34 in the upper central portion of the compressor through an inlet passage 32 which is arranged to enter the lower portion of the oil separating chamber 34 as best shown in Figure 1. The refrigerant vapor leaves the chamber 34 through one or more passages 36 which lead to the suction ports 38 of the individual cylinders.

Figure 2:
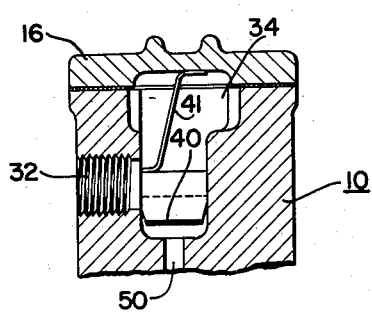
Figure 2 is a fragmentary vertical sectional view taken substantially on line 2—2 of Figure 1.

Means are provided to prevent the oil which returns to the compressor with the refrigerant vapor from being swept from the chamber 34 into the passages 36. This means includes a sheet metal baffle element 40 which is constructed and arranged as best shown in Figures 1, 2 and 4. The sheet metal baffle 40 is held in place by a spring element 41 and is spaced from the bottom wall of the chamber 34. It has a contour corresponding very closely to the contour of the bottom wall of the chamber 34. A drain hole 44 is provided in the baffle 40 and this hole is covered by a spring 42 having upwardly projecting portions as best shown in Figure 1.

Any lubricant which tends to be swept along with the refrigerant flowing over the upper surface of the baffle 40 tends to collect on the screen 42 and will drain down beneath the baffle 40 where it is then free to flow into the oil return passage 50 provided in the lower portion of the chamber 34. In effect, the baffle 40 constitutes a false floor for the chamber 34 which helps to separate the refrigerant vapor from the oil.

The passage 50 leads directly to the inlet of an oil pump 52 which is operated by means of the main crankshaft 20. The oil pump 52 discharges oil through a passage 54 which leads to the main oil sump 60 formed in the bottom of the compressor casing 10. A second oil pump 56 is also driven by the main crankshaft 20 and has its inlet connected to an oil passage 48 which communicates with the oil in the main oil sump 60. The pump 56 discharges oil into a transversely extending passage 62 formed in the bearing insert 22 as shown in Figure 1. The outlet of oil passage 62 leads to the main shaft seal cavity 64 so as to provide lubrication to the shaft seal 65. The cavity 64 is in effect a second oil sump. The oil pumped into the shaft seal cavity leads to a second transversely extending lubricant passage 66 provided in the upper part of the bearing insert 22. The oil passage 66 supplies oil to the main bearing through suitable oil passages such as the passage 68 which leads to the inlet of the main lubricant supply passage 70 provided in the main crankshaft 20. The lubricant passage 70 is formed by drilling a plurality of intersecting holes in the crankshaft as best shown in Figure 1 of the drawing so as to supply lubricant under pressure to each of the bearing surfaces. Excess lubricant discharges into a small cavity 72 at the end of the crankshaft 20, from whence the oil can flow through a passage 74 provided in the bearing 24 into a passage 76 which discharges the excess oil back into the main crankcase.

Figure 3:
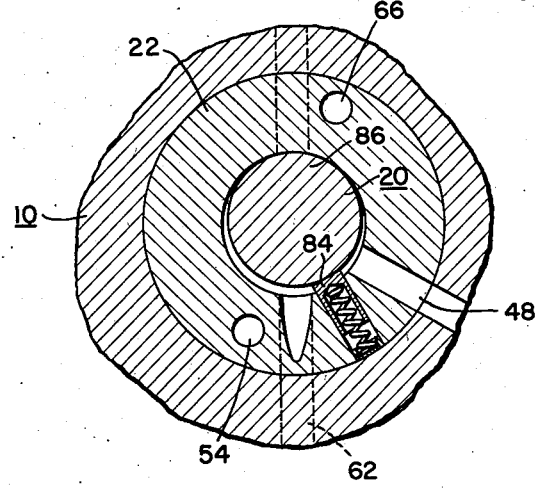
Figure 3 is a fragmentary sectional view taken substantially on line 3—3 of Figure 1.

The oil pumps 52 and 56 may be of any conventional type. For purposes of illustration they have been shown as conventional rotary oil pumps of the type shown in Figure 3 wherein the oil enters the pump chamber through an inlet port 48 and discharges through an outlet port 62. The usual form of spring pressed divider block 84 is provided for separating the inlet port from the outlet shown. An eccentric portion 86 formed directly on the crankshaft 20 serves as the impeller in accordance with well known pumping practice.

A pressure relief valve 91 has been provided as shown in order to prevent excessive oil pressures in the oil feed passage 66. Under normal operating conditions the valve 91 will remain in the closed position whereas at excessively high compressor speeds when the output of the lubricant pump 56 may be greater than required, the valve 91 will open enough to prevent dangerously high oil pressures.

In order to prevent the projecting portions of the crankshaft from dipping into the oil in the lower portion of the crankcase an oil excluding pan or baffle 90 has been provided which is in the form of a semicylindrical member which excludes the oil from the path of the crankshaft. This pan is open at the top as best shown in Figure 5 and allows the oil level in the crankcase to rise considerably above the level where it would otherwise be churned up by the crankshaft.

It is desirable to provide a pressure equalizing passage such as the passage 100 between the suction inlet 32 and the crankcase.

Since there may be times when that oil which is in the crankshaft may be converted into a large volume of froth which would normally slop over into the compressor inlet port, means must be provided for preventing the frothing lubricant from entering the inlet ports of the compressor.

In the embodiment shown, the passage or aperture 100 has been provided in the bottom wall of the suction chamber 34 over which there is placed a porous sintered metal disc 102 as shown in Figure 1. This porous metal disc 102 affords very little restriction to the passage of refrigerant vapor between the suction or inlet chamber 34 and the main crankcase during normal operation of the compressor. When the mixture of refrigerant and lubricant in the crankcase is converted into a froth the disc 102 serves to separate the lubricant from the refrigerant as the froth passes through the disc 102. In other words, the lubricant emerging from the upper side of the disc 102 is no longer in the form of froth and therefore tends to drain down towards the lubricant return passage 50 while the refrigrant vapor released from the froth is free to flow into the suction ports of the compressor cylinders.

The compressed refrigerant leaving the usual outlet chambers 104 in the cylinder heads 14 discharges through suitable ports 106 into an outlet chamber 108 having an outlet passage 110 through which the compressed refrigerant discharges on its way to the condenser.

It will be noted that relatively cold lubricant from the inlet chamber 34 flows in thermal exchange relationship with the main bearing insert 22 on its way to the main oil sump and thereby aids in cooling this bearing.

While the form of embodiment of the invention as herein disclosed constitutes a preferred form, it is to be understood that other forms might be adopted, as may come within the scope of the claims which follow.

What is claimed is as follows:

1. In a refrigerating system wherein a mixture of refrigerant and oil are circulated through a closed circuit, a compressor including a housing having cylinder bores formed therein and having a crankcase which forms an oil storage sump, a crankshaft in said housing, crankshaft bearing means in said housing, said crankshaft having offset crank portions projecting into the oil sump, an oil excluding baffle supported from said crankcase, surrounding the lower portion of said crankshaft and serving to prevent the oil in said sump from coming in direct contact with said crankshaft, piston means within said cylinder bores and operated by said crankshaft, cylinder head means secured to said housing and having inlet and outlet ports formed therein, means forming a common suction chamber in an upper portion of said housing communicating with said inlet ports, said chamber having an inlet through which a mixture of oil and gas to be compressed enters said chamber, said chamber having outlet means spaced from said inlet, a false floor in said chamber spaced from the bottom of said chamber and having means for the passage of oil from above the false floor to a point below the floor, and pump means operatively connected to said shaft and communicating with said suction chamber and said oil storage sump for pumping oil from said suction chamber into said oil storage sump.

2. In a refrigerating system wherein a mixture of refrigerant and oil are circulated through a closed circuit, a compressor including a housing having cylinder bores formed therein and having a crankcase which forms an oil storage sump, a crankshaft in said housing, crankshaft bearing means in said housing, said crankshaft having offset crank portions projecting into the oil sump, an oil excluding baffle supported from said crankcase, surrounding the lower portion of said crankshaft and serving to prevent the oil in said sump from coming in direct contact with said crankshaft, piston means within said cylinder bores and operated by said crankshaft, cylinder head means secured to said housing and having inlet and outlet ports formed therein, means forming a common suction chamber communicating with said inlet ports, said chamber having an inlet through which a mixture of oil and gas to be compressed enters said chamber, said chamber having outlet means spaced from said inlet, a false floor in said chamber spaced from the bottom of said chamber and having means for the passage of oil from above the false floor to a point below the floor, pump means operatively connected to said shaft and communicating with said suction chamber and said oil storage sump for pumping oil from said suction chamber into said oil storage sump, and second pump means for feeding oil from said sump to said crankshaft bearing means.

3. In a refrigerating system wherein a mixture of refrigerant and oil are circulated through a closed circuit, a refrigerant compressor including a main housing having an oil sump therein, a crankshaft having offset crank portions projecting into said oil sump, refrigerant pumping means operated by said crankshaft, an oil excluding baffle within said oil sump for maintaining oil in said sump out of contact with said crankshaft, said housing having an inlet chamber in an upper portion thereof through which refrigerant flows on its way to said refrigerant pumping means, means within said inlet chamber for separating oil from the refrigerant entering said inlet chamber, and an oil pump operatively connected to said crankshaft having an inlet communicating with said inlet chamber and having an outlet communicating with said oil sump.

4. In a refrigerating system wherein a mixture of refrigerant and oil are circulated through a closed circuit, a refrigerant compressor including a main housing having an oil sump therein, a crankshaft in said housing, refrigerant pumping means operated by said crankshaft, said housing having an inlet chamber in an upper portion thereof through which refrigerant flows on its way to said refrigerant pumping means, means within said inlet chamber for separating oil from the refrigerant entering said inlet chamber, and an oil pump operatively connected to said crankshaft having an inlet communicating with said inlet chamber and having an outlet communicating with said oil sump, said inlet chamber having a vent aperture in its one wall communicating with said oil sump.

5. In a refrigerating system wherein a mixture of refrigerant and oil are circulated through a closed circuit, a refrigerant compressor including a main housing having an oil sump therein, a crankshaft, refrigerant pumping means operated by said crankshaft, said housing having an inlet chamber through which refrigerant flows on its way to said refrigerant pumping means, means within said inlet chamber for separating oil from the refrigerant entering said inlet chamber, an oil pump operated by said crankshaft having an inlet communicating with said inlet chamber and having an outlet communicating with said oil sump, said inlet chamber having a vent aperture in its one wall communicating with said oil sump, and means carried by said compressor and arranged in the path of the refrigerant and oil flowing through said vent aperture for agglomerating any frothing oil which may flow through said vent aperture.

6. In a refrigerating system wherein a mixture of refrigerant and oil are circulated through a closed circuit, a compressor including a housing having an oil sump therein, a crankshaft having offset crank portions projecting into said oil sump, refrigerant pumping means operatively connected to said crankshaft, an oil excluding baffle within said oil sump for maintaining oil in said sump out of contact with said crankshaft, means cooperating with said housing and forming a refrigerant inlet chamber in an upper portion of said housing and ahead of said pumping means through which the refrigerant entering said pumping means is required to flow, means within said inlet chamber for separating oil from the refrigerant entering said chamber, an oil pump operated by said crankshaft having an inlet communicating with said chamber and having an outlet communicating with said oil sump, bearing means for said crankshaft, and a second oil pump operatively connected to said crankshaft for forcefully feeding oil from said sump to said bearing means.

7. In a refrigerating system wherein a mixture of refrigerant and oil are circulated through a closed circuit, a compressor comprising a housing including a crankcase forming an oil sump, a crankshaft in said crankcase, bearing means in said housing for said crankshaft, pumping means operatively connected to said crankshaft, means forming a chamber in an upper portion of said housing into which a mixture of refrigerant vapor and oil is adapted to enter before entering said pumping means, said chamber having an inlet adjacent one end thereof and having an outlet spaced therefrom, a baffle in said chamber spaced from the bottom of said chamber and forming with the bottom wall of said chamber an oil passage, an oil drain passage in said baffle and an oil pump operatively connected to said shaft having an inlet connected with said oil passage and having an outlet connected to said oil sump.

8. Refrigerating apparatus comprising a closed refrigerant circuit including a compressor, said compressor comprising a housing having a pair of communicating chambers separated from one another by means of a wall having a vent opening therein, means for introducing a mixture of lubricant and refrigerant to be compressed into a first of said chambers, a driveshaft having a portion disposed within the second of said chambers, pumping means within said housing having inlet and outlet ports, means for conveying refrigerant from said first chamber to said inlet port, a porous element disposed within said vent opening providing a plurality of breather passages between said first and second compartments, and constituting means for preventing the introduction of lubricant in the form of froth from said second chamber to said first chamber, and means for returning lubricant from the lower portion of said first chamber into said second chamber.

9. Refrigerating apparatus comprising a closed refrigerant and lubricant circuit including a compressor having a housing provided with a plurality of cylinder bores and a crankcase forming a lubricant sump, a crankshaft projecting into said crankcase, bearing means carried by said housing for said crankshaft, piston means within said cylinder bores operated by said crankshaft, cylinder head means having inlet and outlet ports formed therein, means forming a common inlet chamber in an upper portion of said housing through which refrigerant to be compressed is required to pass on its way to said inlet ports, said inlet chamber having an inlet spaced from the bottom of said chamber, a baffle in said chamber beneath said inlet and spaced from the bottom of said chamber, said baffle having means for the passage of lubricant from the upper portion of said chamber into the lower portion thereof, and lubricant handling pump means operatively connected to said shaft for pumping lubricant from the bottom of said chamber into said oil sump.

References Cited in the file of this patent

UNITED STATES PATENTS

| | | |
|---|---|---|
| 1,369,618 | Christensen | Feb. 22, 1921 |
| 2,008,715 | Hull | July 23, 1935 |
| 2,233,168 | Johnson | Feb. 25, 1941 |
| 2,283,024 | Wolfert | May 12, 1942 |
| 2,387,117 | Buehler | Oct. 16, 1945 |

FOREIGN PATENTS

| | | |
|---|---|---|
| 579,149 | Germany | June 22, 1933 |